(12) United States Patent
Gaddam et al.

(10) Patent No.: US 12,107,490 B1
(45) Date of Patent: Oct. 1, 2024

(54) VOLTAGE REGULATOR HAVING PROGRAMMABLE ADAPTIVE DEAD TIME

(71) Applicant: Empower Semiconductor, Inc., Milpitas, CA (US)

(72) Inventors: Narendra Nath Gaddam, Milpitas, CA (US); Trey Roessig, Palo Alto, CA (US); David Lidsky, Oakland, CA (US)

(73) Assignee: Empower Semiconductor, Inc., San Jose, CA (US)

( * ) Notice: Subject to any disclaimer, the term of this patent is extended or adjusted under 35 U.S.C. 154(b) by 65 days.

(21) Appl. No.: 17/453,473

(22) Filed: Nov. 3, 2021

Related U.S. Application Data

(60) Provisional application No. 63/109,718, filed on Nov. 4, 2020.

(51) Int. Cl.
*H02M 1/38* (2007.01)
*H02M 3/157* (2006.01)

(52) U.S. Cl.
CPC ............. *H02M 1/38* (2013.01); *H02M 3/157* (2013.01)

(58) Field of Classification Search
CPC ........... H02M 1/08; H02M 1/38; H02M 3/157
See application file for complete search history.

(56) References Cited

U.S. PATENT DOCUMENTS

| | | | | |
|---|---|---|---|---|
| 3,697,843 A * | 10/1972 | Riess | ................... | H02M 7/5155 363/137 |
| 4,504,899 A * | 3/1985 | Jessee | ................ | H02M 7/53871 363/56.02 |
| 5,930,132 A * | 7/1999 | Watanabe | ............. | H03F 3/2171 363/41 |
| 8,884,599 B2 * | 11/2014 | Herzer | ................ | H02M 3/1588 323/283 |
| 2008/0049473 A1 * | 2/2008 | Sugahara | ............. | H02M 3/156 363/84 |
| 2008/0298101 A1 * | 12/2008 | Kim | ........................ | H02M 1/38 363/127 |
| 2009/0066382 A1 * | 3/2009 | Yousefzadeh | ....... | H02M 3/1584 327/175 |
| 2014/0002141 A1 * | 1/2014 | Barrenscheen | ......... | H02M 1/08 327/108 |
| 2014/0240020 A1 * | 8/2014 | Kris | ........................ | H02M 1/08 327/241 |
| 2015/0256075 A1 * | 9/2015 | Lin | ........................ | H02M 1/38 323/271 |

(Continued)

*Primary Examiner* — Gustavo A Rosario-Benitez
(74) *Attorney, Agent, or Firm* — Fisher Broyles, LLP

(57) ABSTRACT

An electronic circuit is disclosed. The electronic circuit includes a switching circuit that includes a high side switch connected to a low side switch at a switch node, a controller arranged to generate a high side control signal and a low side control signal, a variable delay circuit arranged to receive the high side control signal and in response transmit a corresponding delayed high side control signal, and to receive the low side control signal and in response transmit a corresponding delayed low side control signal, a high side driver circuit arranged to transmit a high side drive signal to the high side switch in response to receiving the delayed high side control signal, and a low side driver circuit arranged to transmit a low side drive signal to the low side switch in response to receiving the delayed low side control signal.

16 Claims, 8 Drawing Sheets

(56) References Cited

U.S. PATENT DOCUMENTS

| | | | |
|---|---|---|---|
| 2015/0349762 A1* | 12/2015 | Kinder | H03K 5/159 |
| | | | 327/108 |
| 2018/0131282 A1* | 5/2018 | Chen | H03K 17/04123 |
| 2020/0153328 A1* | 5/2020 | Ko | H02M 1/08 |
| 2020/0259415 A1* | 8/2020 | Chiu | H02M 3/1584 |
| 2021/0099070 A1* | 4/2021 | Sahni | H03K 17/08 |

* cited by examiner

VOLTAGE REGULATOR HAVING PROGRAMMABLE ADAPTIVE DEAD TIME

CROSS-REFERENCE TO RELATED APPLICATION

This application claims the benefit of U.S. Provisional Patent Application No. 63/109,718, titled "VOLTAGE REGULATOR HAVING PROGRAMMABLE DEAD TIME," filed Nov. 4, 2020, which is hereby incorporated in its entirety and for all purposes.

TECHNICAL FIELD

The subject matter described herein relates to voltage regulator circuits, and more particularly to voltage regulator circuits having programmable adaptable dead times.

BACKGROUND

In voltage regulator circuits, output voltages may be generated using a high side switch that sources current to an output and a low side switch that sinks current from the output. In order to prevent both the high side switch and the load side device from simultaneously conducting current, a brief time, called a dead time, during which both the high side device and the low side switch are off occurs between the high side switch turning off and the low side switch turning on, and again between the low side switch turning off and the high side switch turning on. The dead time is preferably no longer than necessary. Improved techniques for controlling the duration of the dead time are needed in the art.

SUMMARY

In some embodiments, a circuit includes a switching circuit that includes a high side switch connected to a low side switch at a switch node, a controller arranged to generate a high side control signal and a low side control signal, a variable delay circuit arranged to receive the high side control signal and in response transmit a corresponding delayed high side control signal, and to receive the low side control signal and in response transmit a corresponding delayed low side control signal, a high side driver circuit arranged to transmit a high side drive signal to the high side switch in response to receiving the delayed high side control signal, and a low side driver circuit arranged to transmit a low side drive signal to the low side switch in response to receiving the delayed low side control signal.

In some embodiments, the controller is further arranged to generate a particular high side control signal, and the variable delay control circuit is arranged to change the high side delay time based on a sign of a timing difference between a first signal corresponding with the particular high side control signal and a second signal corresponding with the low side drive signal.

In some embodiments, the high side delay time is increased in response to the first signal occurring before the second signal.

In some embodiments, the high side delay time is decreased in response to the first signal occurring after the second signal.

In some embodiments, the variable delay control circuit is arranged to cease changing the high side delay time in response to a plurality of signs of timing differences between pairs of first and second signals having occurred in a predetermined sequential pattern.

In some embodiments, the variable delay control circuit includes a shift register arranged to store data representing the plurality of signs of the timing differences, and a comparator arranged to compare a stored data of the shift register to data representing the predetermined sequential pattern.

In some embodiments, the high side delay time is programmable.

In some embodiments, the variable delay control circuit is arranged to change the low side delay time based on a sign of a timing difference between a first signal corresponding with a low side drive signal and a second signal corresponding with the high side drive signal.

In some embodiments, the low side delay time is increased in response to the first signal occurring before the second signal.

In some embodiments, the low side delay time is decreased in response to the first signal occurring after the second signal.

In some embodiments, the variable delay control circuit is arranged to cease changing the low side delay time in response to a plurality of signs of timing differences between pairs of first and second signals having occurred in a predetermined sequential pattern.

In some embodiments, the variable delay control circuit includes a shift register arranged to store data representing the plurality of signs of the timing differences, and a comparator arranged to compare a stored data of the shift register to data representing the predetermined sequential pattern.

In some embodiments, a method includes providing a switching circuit that includes a high side switch connected to a low side switch at a switch node, generating a plurality of high side control signals and a plurality of low side control signals, generating a corresponding delayed high side control signal in response to receiving each of the plurality of high side control signals, generating a corresponding delayed low side control signal in response to receiving each of the plurality of low side control signals, electrically connecting the switch node to a power supply via the high side switch in response to receiving the delayed high side control signal, and electrically connecting the switch node to a ground node via the low side switch in response to receiving the delayed low side control signal.

In some embodiments, the method includes providing the switching circuit with a high side driver circuit and a low side driver circuit.

In some embodiments, the method includes after the electrically connecting the switch node to the power supply, the delayed high side control signal causes the high side switch to disconnect the switch node from the power supply.

In some embodiments, the method further includes generating a particular high side control signal, and further includes changing the high side delay time based on a sign of a timing difference between a first signal corresponding with the particular high side control signal and a second signal corresponding with one of the low side signals.

In some embodiments, the method further includes increasing the high side delay time in response to the first signal occurring before the second signal.

In some embodiments, the method further includes decreasing the high side delay time in response to the first signal occurring after the second signal.

In some embodiments, the method further includes ceasing to change the high side delay time in response to a number of occurrences of signs of timing differences between pairs of first and second signals having occurred in a predetermined sequential pattern.

In some embodiments, the method includes after the electrically connecting the switch node to the ground node, the delayed low side control signal causes the low side switch to disconnect the switch node from the ground node.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Therefore, the invention is not limited to particular embodiments disclosed herein. For example, certain aspects and principles are discussed with reference to a particular power converter circuit. However, as understood by those of ordinary skill in the art, the various aspects and principles may be used in embodiments of other types of switching power converters, such as resonant, buck, boost, buck-boost, and flyback regulators. Furthermore, as understood by those of ordinary skill in the art, while the various aspects and principles are discussed herein with reference to use of a pulse width modulation (PWM) controller, other controllers and control schemes are used in alternative embodiments. In addition, in the embodiments discussed below, MOSFETs are used. However, in some embodiments other transistors or other switches are used.

Circuit features of voltage regulator circuits providing controllable dead times are described herein with reference to certain embodiments. Some of the features are illustrated in the figures. For example, the figures illustrate circuits which generate a regulated voltage with controlled dead times. The circuits can use programmable delay lines to control the dead times. The circuits can also sense outputs of the delay lines to generate control signals to control the delay of the delay lines to achieve desired dead times.

Embodiments of the present disclosure can allow voltage regulators having programmable adaptive dead time to be used in zero voltage switching (ZVS) applications. In some embodiments, techniques for programmable adaptive dead time can have self-adjusting dead times that are based on the converter load currents. In various embodiments, techniques for programmable adaptive dead time can be independent of manufacturing process variations. In some embodiments, voltage regulators having programmable adaptive dead time can have improved power efficiency. In various embodiments, techniques for programmable adaptive dead time can eliminate body diode conduction in the voltage regulator.

Figure 1:
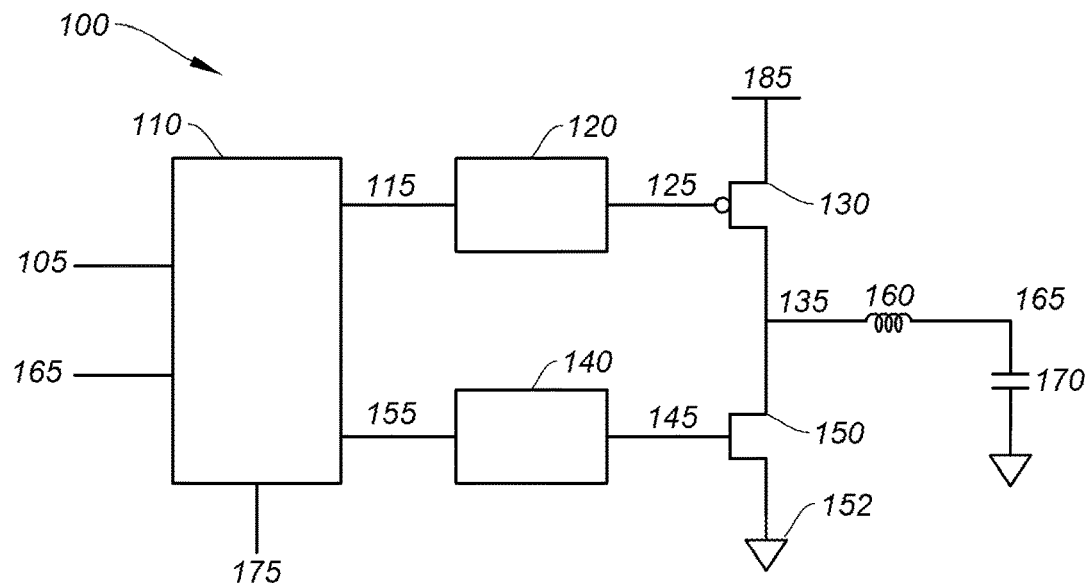
FIG. 1 is a schematic diagram of an embodiment of a voltage regulator circuit.

FIG. 1 is a schematic illustration of a switching voltage regulator circuit 100 according to some embodiments of the disclosure. Switching voltage regulator circuit 100 is a switching voltage regulator that is configured to generate an output voltage at output node 165 based on a reference voltage at reference input node 105, on a power voltage at power input node 185 and on a clock at clock input node 175.

Switching voltage regulator circuit 100 can include controller 110, high side driver circuit 120, high side switch 130, low side driver circuit 140, low side switch 150, inductor 160, and output capacitor 170. In some embodiments high side switch 130 can be a PMOS enhancement type switch that turns off with a "high" signal and low side switch can be an NMOS enhancement type switch that turns on with a "high" signal, however, other types of suitable semiconductor switches can be used and are within the scope of this disclosure.

In this embodiment, controller 110 can generate high side pulses in high side control signal 115 for high side driver circuit 120. Each high side pulse is received by high side driver circuit 120, and, in response to the received high side pulse, high side driver circuit 120 can provide high side drive signal 125 to the high side switch 130, causing the high side switch 130 to turn on resulting in inductor 160 to be electrically connected to power input node 185.

Controller 110 also generates low side pulses in low side control signal 155 for low side driver circuit 140. Each low side pulse is received by low side driver circuit 140, and, in response to the received low side pulse, low side driver circuit 140 can provide low side signal 145 to the low side switch 150, causing the low side switch 150 to turn on resulting in inductor 160 to be electrically connected to ground node 152.

The synchronous selective electrical connection of inductor 160 with the power input node 185 and the ground node can cause charge to be delivered to the output capacitor 170 and to a load (not shown) connected to output node 165.

Furthermore, controller 110 can receive the output voltage at output node 165. In addition, controller 110 can generate the high side pulses and the low side pulses based partly on a difference between the output voltage at output node 165 and the reference voltage at reference input node 105. As a result the voltage at output node 165 is maintained by operating voltage regulator circuit 100 so that the voltage at the output node 165 is approximately equal to the reference voltage at reference input node 105. In some embodiments, a voltage derived from the voltage at the output node 165 can be used in controller 110 to compare to the reference voltage at reference input node 105. For example, a scaled down version of the voltage at output node, created by a resistor divider, can be used to compare to the reference voltage at reference input node 105.

Figure 2:
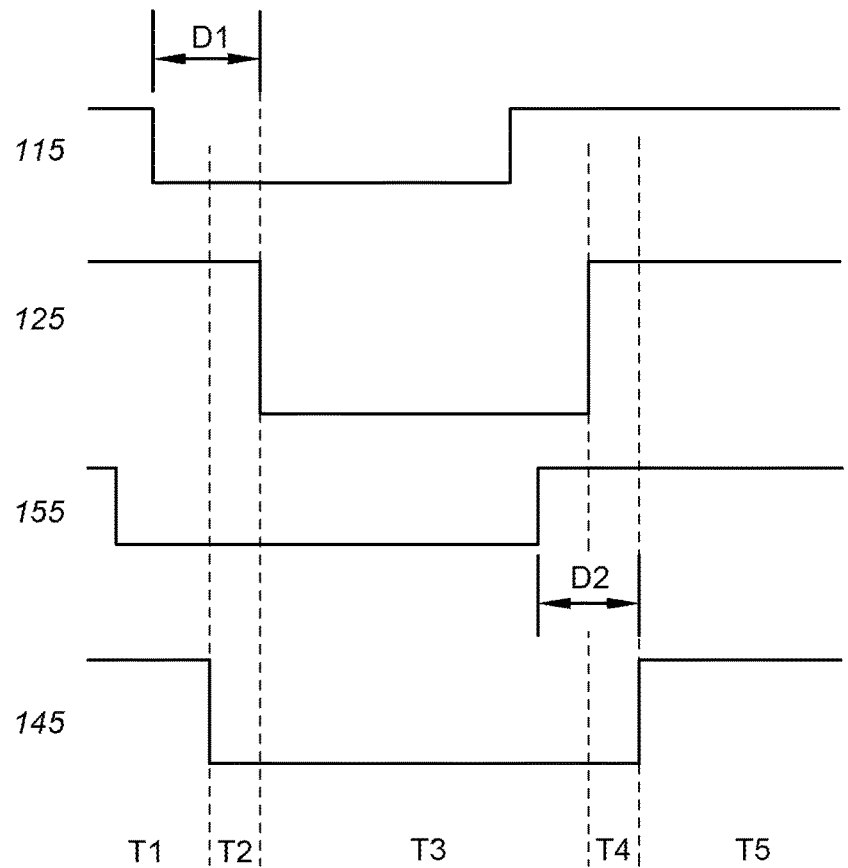
FIG. 2 is a waveform diagram illustrating an embodiment of an operation of the voltage regulator circuit of FIG. 1.

FIG. 2 is a waveform diagram illustrating an embodiment of an operation of the switching voltage regulator circuit 100 of FIG. 1.

Referring to FIGS. 1 and 2, during time T1, controller 110 causes the high side signal 125 to be high and causes the low side signal 145 to be high. Accordingly, during time T1, high side switch 130 is off or not conductive, and low side switch 150 is on or conductive. As a result, during time T1, switch node 135 is electrically connected with the ground node 152 by low side switch 150.

During time T2, the high side signal 125 remains high, and the low side signal 145 is caused to be low. Accordingly, during time T2, high side switch 130 is not conductive and low side switch 150 is also not conductive. Therefore, time T2 may be considered a first dead time.

The end of time T2 and the beginning of time T3 is marked by the high to low transition in the high side signal 125 (also shown by a dashed line in FIG. 2). In this embodiment, high side driver circuit 120 causes the high to low transition in the high side signal 125 in response to a high to low transition in the high side control signal 115, which occurred during T1, from controller 110. In this embodiment, high side driver circuit 120 causes the high to low transition in the high side signal 125 after a first delay time D1 that starts with the high to low transition in the high side control signal 115 and ending with the high to low transition in the high side signal 125. In this embodiment, the first delay time D1 is fixed or not programmable and is controlled by controller 110.

During time T3, the high side signal 125 is caused to be low, and the low side signal 145 remains low. Accordingly, during time T3, high side switch 130 is on or conductive, and low side switch 150 is not conductive. As a result, during time T3, switch node 135 is electrically connected with the power input node 185 by high side switch 130.

During time T4, the high side signal 125 is caused to be high, and the low side signal 145 remains low. Accordingly, during time T4, high side switch 130 is not conductive and low side switch 150 is also not conductive. Therefore, time T4 may be considered a second dead time.

The end of time T4 and the beginning of time T5 is marked by the low to high transition in the low side signal 145. In this embodiment, low side driver circuit 140 causes the low to high transition in the low side signal 145 in response to a low to high transition in the low side control signal 155 from controller 110. In this embodiment, low side driver circuit 140 causes the low to high transition in the low side signal 145 after a second delay time D2 that starts with the low to high transition in the low side control signal 155, and ends with the low to high transition in the low side signal 145. In this embodiment, the second delay is fixed or not programmable and is controlled by controller 110.

During time T5, the high side signal 125 is caused to be high, and the low side signal 145 is caused to be high. Accordingly, during time T5, high side switch 130 is off or not conductive, and low side switch 150 is on or conductive. As a result, during time T5, switch node 135 is electrically connected with the ground node by low side switch 150.

Therefore, the operation of the switching voltage regulator circuit 100 during time T5 is similar or identical to the operation of the switching voltage regulator circuit 100 during time T1.

Figure 3A:
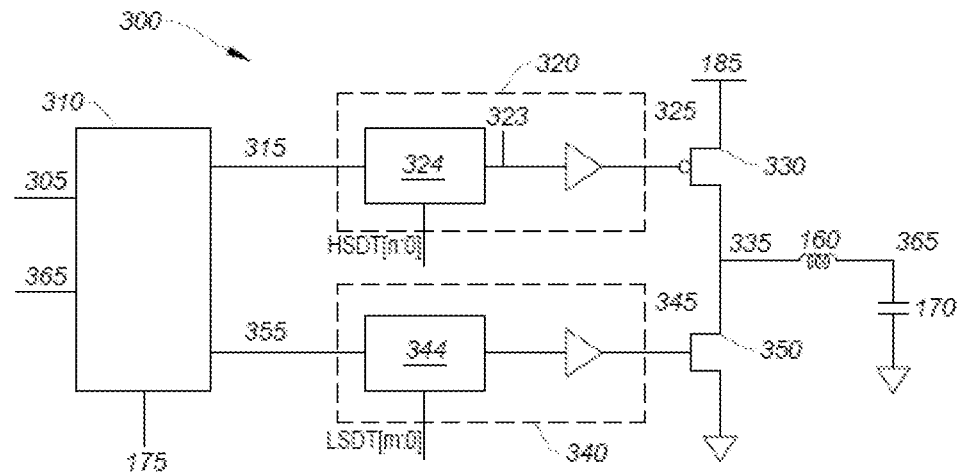
FIG. 3A is a schematic diagram of an embodiment of voltage regulator circuit.

FIG. 3A is a schematic illustration of a switching voltage regulator circuit 300 according to some embodiments. Switching voltage regulator circuit 300 is a switching voltage regulator that is configured to generate an output voltage at output node 365 based on a reference voltage at reference input node 305, on a power voltage at power input node 185, and on a clock at clock input node 175.

Switching voltage regulator circuit 300 can include controller 310, high side driver circuit 320, high side switch 330, low side driver circuit 340, low side switch 350, inductor 160, and output capacitor 170.

In this embodiment, controller 310 can generate high side pulses in high side control signal 315 for high side driver circuit 320. Each high side pulse is received by high side driver circuit 320, and, in response to the received high side pulse, after a high side variable delay controlled by variable delay line 324, high side driver circuit 320 can provide high side drive signal 325 to the high side switch 330, causing the high side switch 330 to turn on resulting in inductor 160 to be electrically connected to power input node 185. The variable delay line 324 may include, for example, any digitally controlled delay line.

Controller 310 can also generate low side pulses in low side control signal 355 for low side driver circuit 340. Each low side pulse is received by low side driver circuit 340, and, in response to the received low side pulse, after a low side variable delay controlled by variable delay line 344, low side driver circuit 340 can provide low side signal 345 to the low side switch 350, causing the low side switch 350 to turn on resulting in inductor 160 to be electrically connected to ground node 152. The variable delay line 344 may include, for example, any digitally controlled delay line.

The synchronous selective electrical connection of inductor 160 with the power input node 185 and the ground node can cause charge to be delivered to the output capacitor 170 and to a load (not shown) connected to output node 365.

Furthermore, controller 310 can receive the output voltage at output node 365. In addition, using techniques understood by those of skill in the art, controller 310 generates the high side pulses and the low side pulses based partly on a difference between the output voltage at output node 365 and the reference voltage at reference input node 305. As a result, as understood by those of skill in the art, the voltage at the output node 365 is maintained by switching voltage regulator circuit 300 such that the voltage at output node 365 is about equal to the reference voltage at reference input node 305. In some embodiments, a voltage derived from the voltage at the output node 365 can be used in controller 310 to compare to the reference voltage at reference input node 305. For example, a scaled down version of the voltage at output node, created by a resistor divider, may be used to compare to the reference voltage at reference input node 305.

Figure 3B:
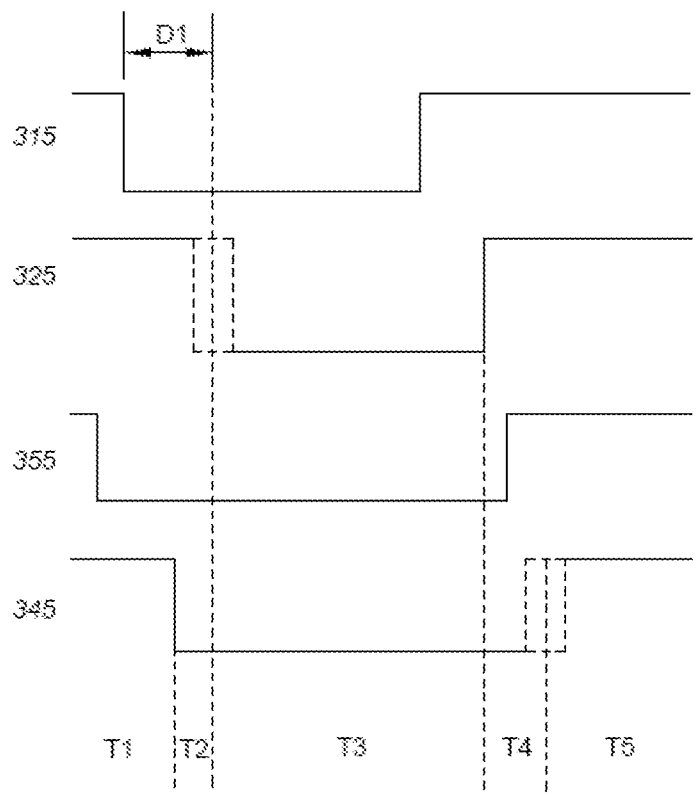
FIG. 3B is a waveform diagram illustrating an embodiment of an operation of the voltage regulator circuit of FIG. 3A.

FIG. 3B is a waveform diagram illustrating an embodiment of an operation of the switching voltage regulator circuit 300 of FIG. 3A.

Referring to FIGS. 3A and 3B, during time T1, the high side signal 325 is caused to be high, and the low side signal 345 is caused to be high. Accordingly, during time T1, high side switch 330 is off or not conductive, and low side switch 350 is on or conductive. As a result, during time T1, switch node 335 is electrically connected with the ground node by low side switch 350.

During time T2, the high side signal 325 remains high, and the low side signal 345 is caused to be low. Accordingly, during time T2, high side switch 330 is not conductive and low side switch 350 is also not conductive. Therefore, time T2 may be considered a first dead time.

The end of time T2 and the beginning of time T3 is characterized by the high to low transition in the high side signal 325. In this embodiment, high side driver circuit 320 causes the high to low transition in the high side signal 325 to occur in response to a high to low transition in the high side control signal 315 from controller 310. In this embodiment, high side driver circuit 320 causes the high to low transition in the high side signal 325 to occur after a first delay time D1 that starts with the high to low transition in the high side control signal 315 and ends with the high to low transition in the high side signal 325.

In this embodiment, the first delay time D1 is programmable according to a first digital signal at input bus HSDT[n:0]. For example, the first delay time D1 may be programmed with the first digital signal so as to control when the end of the first dead time of time T2 occurs. The variable delay control circuit of FIG. 3C may be used to generate the first digital signal.

In some embodiments, high side driver circuit 320 is also configured such that the delay between a low to high transition in the high side control signal 315 and the corresponding low to high transition in the high side signal 325 is fixed and is not changed based on the first digital signal.

During time T3, the high side signal 325 is caused to be low, and the low side signal 345 remains low. Accordingly, during time T3, high side switch 330 is on or conductive, and low side switch 350 is not conductive. As a result, during time T3, switch node 335 is electrically connected with the power input node 185 by high side switch 330.

During time T4, the high side signal 325 is caused to be high, and the low side signal 345 remains low. Accordingly, during time T4, high side switch 330 is not conductive and low side switch 350 is also not conductive. Therefore, time T4 may be considered a second dead time.

The end of time T4 and the beginning of time T5 is characterized by the low to high transition in the low side signal 345. In this embodiment, low side driver circuit 340 causes the low to high transition in the low side signal 345 to occur in response to a low to high transition in the low side control signal 355 from controller 310. In this embodiment, low side driver circuit 340 causes the low to high transition in the low side signal 345 to occur after a second delay time D2 that starts with the low to high transition in the low side control signal 355, and ends with the low to high transition in the low side signal 345.

In this embodiment, the second delay time D2 is programmable according to a second digital signal at input bus LSDT[m:0]. For example, the second delay time D2 may be programmed with the second digital signal so as to control when the end of the second dead time of time T4 occurs. An embodiment of a variable delay control circuit which may be used to generate the second digital signal is discussed below with reference to FIG. 7.

In some embodiments, low side driver circuit 340 is also configured such that the delay between a high to low transition in the low side control signal 355 and the corresponding high to low transition in the low side signal 345 is fixed and is not changed based on the second digital signal.

During time T5, the high side signal 325 is caused to be high, and the low side signal 345 is caused to be high. Accordingly, during time T5, high side switch 330 is off or not conductive, and low side switch 350 is on or conductive. As a result, during time T5, switch node 335 is electrically connected with the ground node by low side switch 350.

Therefore, the operation of the switching voltage regulator circuit 300 during time T5 is similar or identical to the operation of the switching voltage regulator circuit 300 during time T1. The operation of the switching voltage regulator circuit 300 may also include repeatedly sequentially cycling through states described with reference times T1-T4 in response to the clock signal at clock input 175.

Figure 3C:
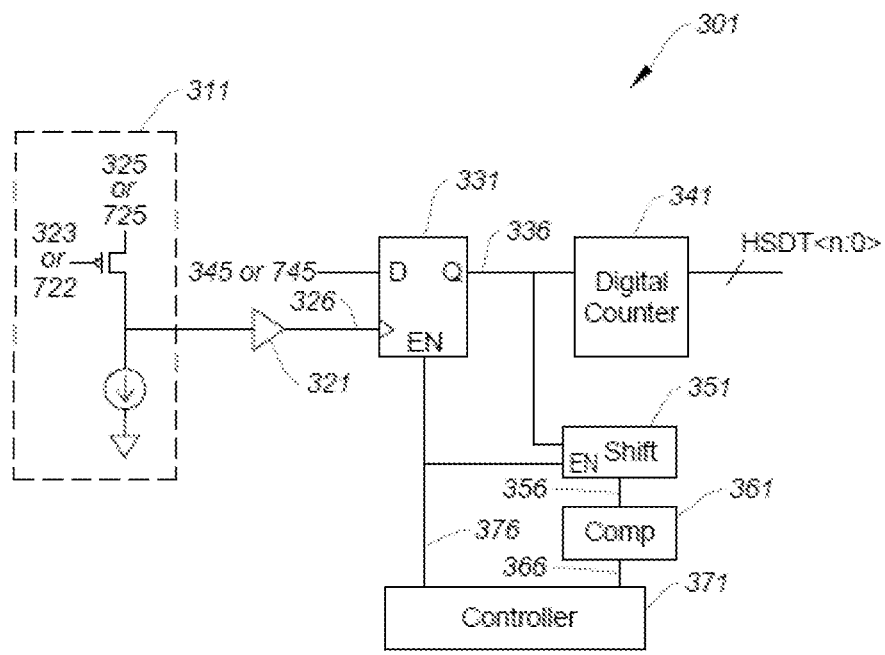
FIG. 3C is a schematic illustration of a variable delay control circuit according to an embodiment of the present disclosure.

FIG. 3C is a schematic illustration of a variable delay control circuit 301 which may be used to generate the digital signal at input bus HSDT[n:0] for variable delay line 324 discussed above with reference to switching voltage regulator circuit 300 of FIG. 3A, and discussed below with reference to switching voltage regulator circuit 700 of FIG. 7.

Variable delay control circuit 301 can include input circuit 311, buffer 321, latch 331, counter 341, shift register 351, digital comparator 361, and controller 371. Variable delay control circuit 301 is arranged to generate the first digital signal at input bus HSDT[n:0] so as to ensure that the low side switch 350 is turned off before the high side switch 330 is turned on.

Input circuit 311 can receive a high side early signal 323. The high side early signal 323 is temporally related to the high side signal 325 or 725 and a transition in the high side early signal 323 provides an indication that the high side signal 325 or 725 has not yet changed, but will after a particular delay time.

The high side early signal 323 transitioning from high to low can cause the input of buffer 321 to transition from low to high. This can cause the latching input of latch 331 to likewise transition from low to high. The latching input of latch 331 transitioning from low to high causes latch 331 to generate an output signal having the same high or low digital logic state as that of the low side signal 345 or 745 when the latching input of latch 331 transitioned from low to high.

The output signal of latch 331 is received by digital counter 341, where the logic state of the received output signal causes the digital counter 341 to either increase or decrease its digital count value at bus HSDT[n:0]. In some embodiments, an inverted output signal of latch 331 may be utilized. In this embodiment, the output signal of latch 331 having a high digital logic state causes the digital counter 341 to increase its digital count value at bus HSDT[n:0], and the output signal of latch 331 having a low digital logic state causes the digital counter 341 to decrease its digital count value at bus HSDT[n:0]. In some embodiments, an inverted output signal of latch 331 may be utilized. In this embodiment, high side driver circuit 320 or 720 is configured to increase the first delay time D1 in response to the digital count value at bus HSDT[n:0] increasing, and is configured to decrease the first delay time D1 in response to the digital count value at bus HSDT[n:0] decreasing.

Digital counter 341 can also receive a clock signal having a frequency equal to the frequency of either of the high side signal 325 or 725 or the low side signal 345 or 745. As understood by those of skill in the art, in response to each received particular edge of the received clock signal, digital counter 341 increases or decreases its digital count value based on the logic state of the received output signal of latch 331. In some embodiments, the increase or decrease of digital count value can be based on an inverted output signal of latch 331.

The output signal of latch 331 is also received by shift register 351. In some embodiments, an inverted output signal of latch 331 may be received by shift register 351. Shift register 351 also receives a clock signal having a frequency equal to the frequency of either of the high side signal 325 or 725 of FIG. 3A or 7, respectively, or the low side signal 345 or 745. As understood by those of skill in the art, in response to each received particular edge of the received clock signal, shift register 351 latches the digital logic state of the output signal of latch 331 and shifts a number N of previously latched digital logic states of the received output signal. Shift register 351 can generate a digital signal for digital comparator 361 encoding the N most recently latched digital logic states of the received output signal.

Digital comparator 361 can receive the digital signal from shift register 351 and compares the received digital signal to one or more digital values, where the one or more digital values each correspond with a value for the digital signal indicating that the current counter value at bus HSDT[n:0] is to be maintained by digital counter 341. For example, the one or more digital values may be alternating high and low logic states, indicating that the output of the digital counter 341 is alternating between first and second counter values at bus HSDT[n:0], and the current counter value at bus HSDT[n:0] is satisfactory.

Digital comparator 361 can generate an output signal for controller 371 indicating whether the received digital signal from shift register 351 is equal to any of the one or more digital values. In response to controller 371 receiving a digital signal from shift register 351 indicating that the current counter value at bus HSDT[n:0] is to be maintained by digital counter 341, controller 371 is arranged to cause digital counter 341 to cease counting and maintain the current counter value at bus HSDT[n:0], for example, by preventing digital counter 341 from receiving the clock signal causing digital counter 341 to increase or decrease the digital counter value, and by preventing shift register 351 from receiving the clock signal causing shift register 351 to latch the digital logic state of the output of latch 331 and change its digital signal output. In the illustrated embodiment, controller 371 additionally disables latch 331 with output 376.

In some embodiments, shift register 351 and comparator 361 are not used, and digital counter 341 continues to increase or decrease the digital counter value at bus HSDT[n:0] as discussed above regardless of the history of the logic state of the output of latch 331.

Figure 3D:
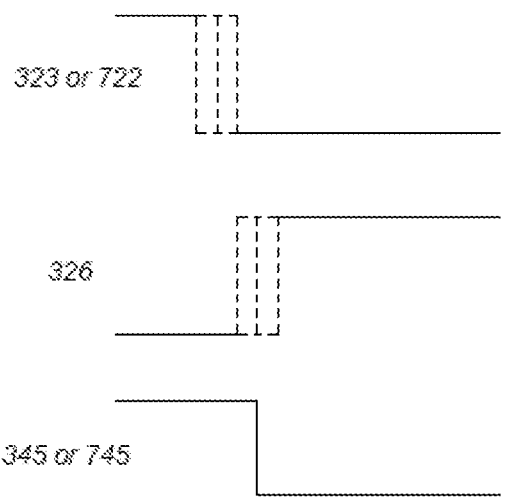
FIG. 3D is a waveform diagram illustrating an embodiment of an operation of the variable delay control circuit of FIG. 3C.

FIG. 3D is a waveform diagram illustrating an embodiment of an operation of the variable delay control circuit 301 of FIG. 3C.

Referring to FIGS. 3C and 3D, as illustrated in FIG. 3D, a substantially fixed delay time after a high to low transition in the early high side signal 323 or 722, a corresponding low to high transition occurs in the latching signal 326. The specific time occurrences of each of the high to low transition in the early high side signal 323 or 722 and the low to high transition in the latching signal 326 relative to the falling edge of the low side signal 345 or 745 is influenced or determined by the digital counter value at bus HSDT[n:0], as discussed above.

In response to the low to high transition in the latching signal 326, latch 331 can generate an output signal having the same high or low digital logic state as that of the low side signal 345 or 745 when the latching signal 326 of latch 331 transitioned from low to high.

Accordingly, if the low side signal 345 or 745 is low when the latching signal 326 transitions from low to high, latch 331 generates an output signal having a low digital logic state. In response to the output signal of the latch 331 having the low digital logic state, digital counter 341 decreases the digital counter value at bus HSDT[n:0]. In response to the decreased digital counter value at bus HSDT[n:0], a next occurrence of the high to low transition in the early high side signal 323 or 722 and the corresponding low to high transition in the latching signal 326 occur earlier with respect to the high to low transition in the low side signal 345 or 745.

Figure 3E:
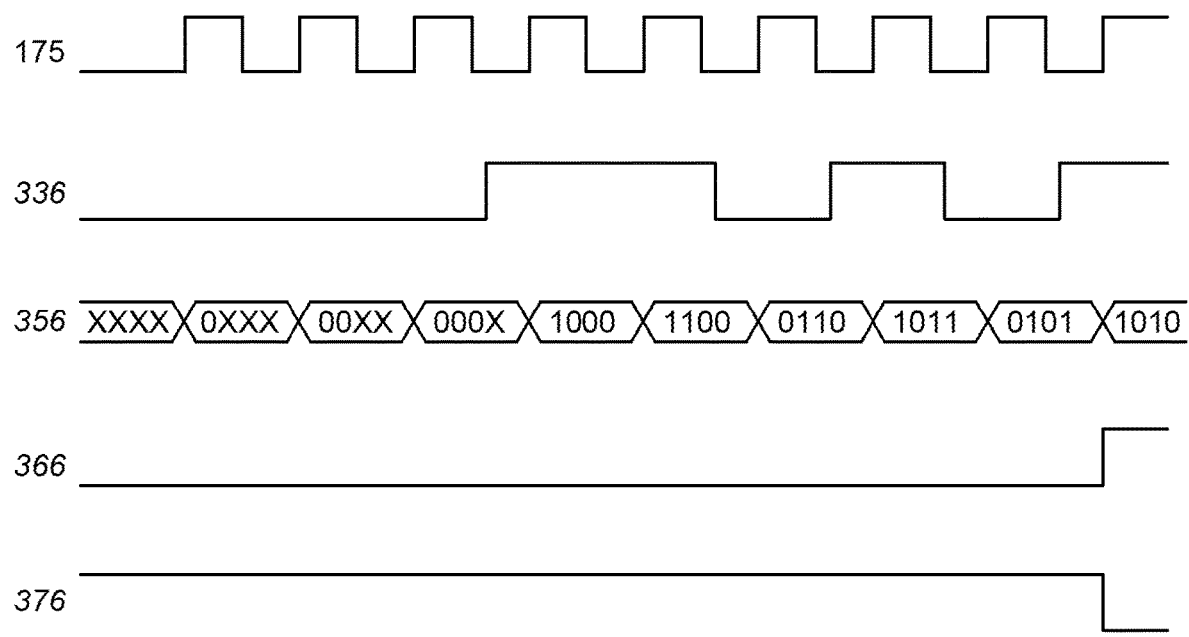
FIG. 3E is a waveform diagram illustrating an embodiment of an operation of the variable delay control circuit of FIG. 3C.

FIG. 3E is a waveform diagram illustrating an embodiment of an operation of the variable delay control circuit of FIG. 3C.

Referring to FIGS. 3C and 3E, at each rising edge of the clock signal 175, shift register 351 latches the digital logic state of the output 336 signal of latch 331 and shifts a number N of previously latched digital logic states of the received output signal. In this embodiment N=4. Shift register 351 generates a digital signal 356 for digital comparator 361 encoding the N (4) most recently latched digital logic states of the received output signal 336.

Digital comparator 361 receives the digital signal 356 from shift register 351 and compares the received digital signal 356 to one or more specified digital values. In the illustrated example, the one or more specified digital values include the value 1010, which corresponds with a value for the digital signal indicating that the current counter value at bus HSDT[n:0] is to be maintained by digital counter 341.

Digital comparator 361 generates an output signal 366 for controller 371 indicating whether the received digital signal 356 from shift register 351 is equal to any of the one or more specified digital values. In the illustrated example, in response to the digital signal 356 becoming equal to 1010, the output signal 366 of the digital comparator 361 indicates that the digital signal 356 from shift register 351 is equal to one of the specified digital values.

In response to controller 371 receiving the digital signal 366 from shift register 351 indicating that the current counter value at bus HSDT[n:0] is to be maintained by digital counter 341, controller 371 causes digital counter 341 to cease counting and maintain the current counter value at bus HSDT[n:0], for example, by changing the state of output 376 to prevent digital counter 341 from receiving the clock signal causing digital counter 341 to increase or decrease the digital counter value, and by preventing shift register 351 from receiving the clock signal causing shift register 351 to latch the digital logic state of the output of latch 331 and change its digital signal output. In the illustrated embodiment, controller 371 additionally disables latch 331 with output 376.

Figure 3F:
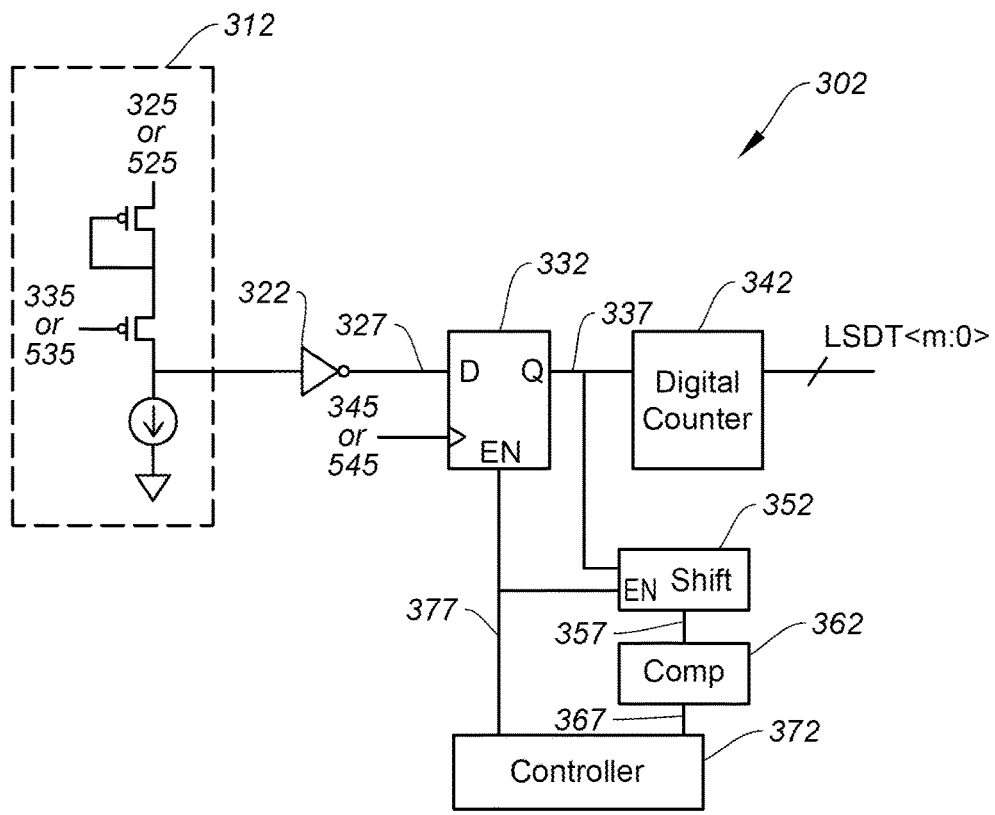
FIG. 3F is a schematic illustration of a variable delay control circuit according to an embodiment of the present disclosure.

FIG. 3F is a schematic illustration of a variable delay control circuit 302 according to an embodiment of the disclosure. Circuit 302 may be used to generate a digital signal at input bus LSDT[m:0] for variable delay line 344 discussed above with reference to switching voltage regulator circuits 300 and 500 of FIGS. 3A and 5, respectively.

Variable delay control circuit 302 can include input circuit 312, inverting buffer 322, latch 332, counter 342, shift register 352, digital comparator 362, and controller 372. In some embodiments, the inverting buffer 322 may include a first and second inverting buffers that form a non-inverting buffer. Variable delay control circuit 302 is configured to generate the digital signal at input bus LSDT[m:0] so as to ensure that the high side signal 325 or 525 causes high side switch 330 or 530 to turn off before the low side signal 345 or 545 causes low side switch 350 or 550 to turn on.

Figure 5:
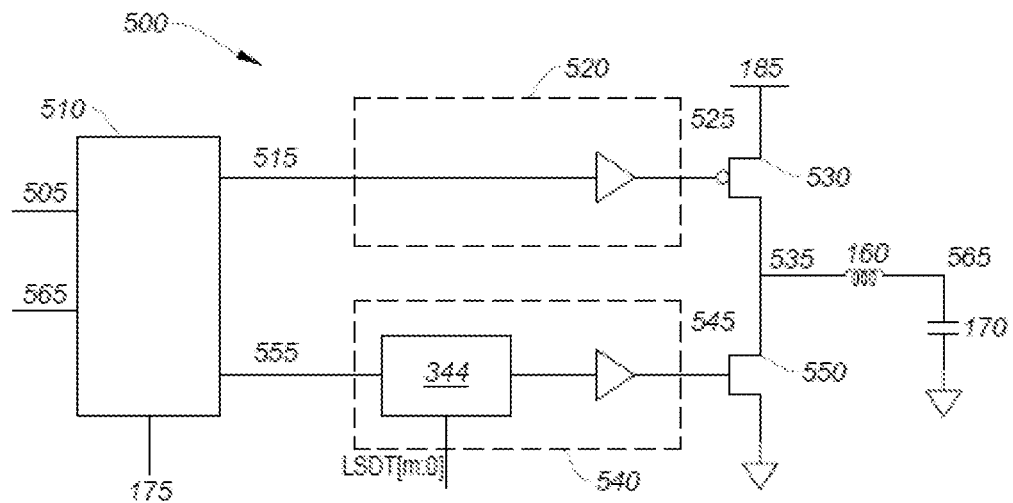
FIG. 5 is a schematic diagram of an embodiment of voltage regulator circuit.

Input circuit 312 can receive a switch node signal 335 or 535, of FIG. 3A or 5, respectively. The switch node signal 335 or 535 transitions from a high state to or toward a low state in response to the high side signal 325 or 525 causing the high side switch 330 or 530 to turn off. Therefore, a high to low transition in the switch node signal 335 or 535 provides an indication that the high side signal 325 or 525 has caused the high side switch 330 or 530 to turn off.

The switch node signal 335 or 535 transitioning from high to low causes the input of inverting buffer 322 to transition from low to high. Accordingly, the switch node signal 335 or 535 transitioning from high to low causes the data input D of latch 332 to transition from high to low.

The latching input of latch 332 can be connected to the low side signal 345 or 545. The latching input of latch 332 transitioning from low to high can cause latch 332 to generate an output signal having the same high or low digital logic state as that of the data input D of latch 332 when the latching input of latch 332 transitioned from low to high.

The output signal of latch 332 is received by digital counter 342, where the logic state of the received output signal causes the digital counter 342 to either increase or decrease its digital count value at bus LSDT[m:0]. In this embodiment, the output signal of latch 332 having a high digital logic state causes the digital counter 342 to increase its digital count value at bus LSDT[m:0], and the output signal of latch 332 having a low digital logic state causes the digital counter 342 to decrease its digital count value at bus LSDT[m:0]. In this embodiment, low side driver circuit 340 or 540 is configured to increase the second delay time D2 in response to the digital count value at bus LSDT[m:0] increasing, and is configured to decrease the second delay time D2 in response to the digital count value at bus LSDT[m:0] decreasing.

Digital counter 342 can also receive a clock signal having a frequency equal to the frequency of either of the high side signal 325 or 525 or the low side signal 345 or 545. As understood by those of skill in the art, in response to each received particular edge of the received clock signal, digital counter 342 increases or decreases its digital count value based on the logic state of the received output signal of latch 332.

The output signal of latch 332 is also received by shift register 352. Shift register 352 also receives a clock signal having a frequency equal to the frequency of either of the high side signal 325 or 525 or the low side signal 345 or 545. As understood by those of skill in the art, in response to each received particular edge of the received clock signal, shift register 352 latches the digital logic state of the output signal of latch 332 and shifts a number N of previously latched digital logic states of the received output signal. Shift register 352 generates a digital signal for digital comparator 362 encoding the N most recently latched digital logic states of the received output signal, as understood by those of skill in the art.

Digital comparator 362 can receive the digital signal from shift register 352 and compares the received digital signal to one or more digital values, where the one or more digital values each correspond with a value for the digital signal indicating that the current counter value at bus LSDT[m:0] is to be maintained by digital counter 342. For example, the one or more digital values may be alternating high and low logic states, indicating that the output of the digital counter 342 is alternating between first and second counter values at bus LSDT[m:0], and the current counter value at bus LSDT[m:0] is satisfactory.

Digital comparator 362 can generate an output signal for controller 372 indicating whether the received digital signal from shift register 352 is equal to any of the one or more digital values. In response to controller 372 receiving a digital signal from shift register 352 indicating that the current counter value at bus LSDT[m:0] is to be maintained by digital counter 342, controller 372 is arranged to cause digital counter 342 to cease counting and maintain the current counter value at bus LSDT[m:0], for example, by preventing digital counter 342 from receiving the clock signal causing digital counter 342 to increase or decrease the digital counter value, and by preventing shift register 352 from receiving the clock signal causing shift register 352 to latch the digital logic state of the output of latch 332 and change its digital signal output. In the illustrated embodiment, controller 372 additionally disables latch 332 with output 377.

In some embodiments, shift register 352 and comparator 362 are not used, and digital counter 342 can continue to increase or decrease the digital counter value at bus LSDT[m:0] as discussed above regardless of the history of the logic state of the output of latch 332.

Figure 3G:
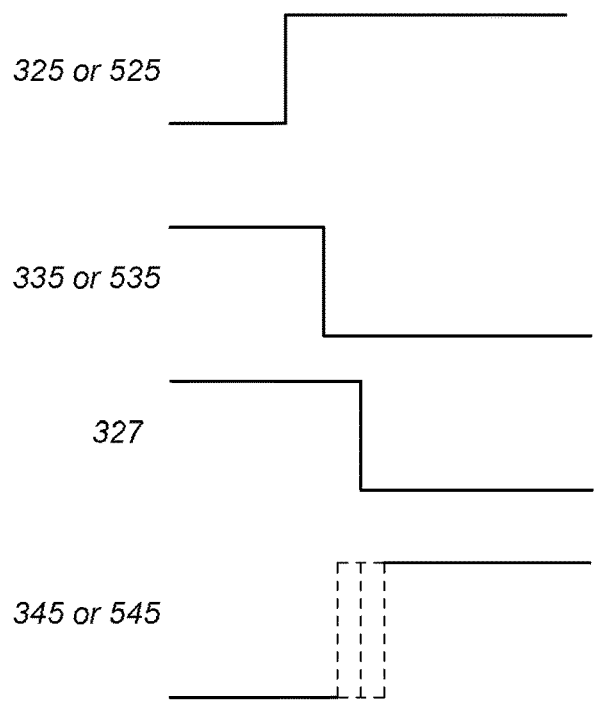
FIG. 3G is a waveform diagram illustrating an embodiment of an operation of the variable delay control circuit of FIG. 3F.

FIG. 3G is a waveform diagram illustrating an embodiment of an operation of the variable delay control circuit 302 of FIG. 3F.

Referring to FIGS. 3F and 3G, as illustrated, a substantially fixed delay time after a low to high transition in the high side signal 325 or 525, a corresponding high to low transition occurs in the switch node signal 335 or 535 and a corresponding high to low transition occurs in the data 327 input D of latch 332.

In addition, the low side signal 345 or 545 transitions from low to high. In response to the low to high transition in the low side signal 345 or 545, latch 332 generates an output signal having the same high or low digital logic state as that of the data input D when the low side signal 345 or 545 transitioned from low to high.

The specific time occurrences of each low to high transition in the low side signal 345 or 545 relative to the falling edge of the data input D is influenced or determined by the digital counter value at bus LSDT[m:0], as discussed above.

Accordingly, if the data input D is low when the low side signal 345 or 545 transitions from low to high, latch 332 generates an output signal having a low digital logic state. In response to the output signal of the latch 332 having the low digital logic state, digital counter 342 decreases the digital counter value at bus LSDT[m:0]. In response to the decreased digital counter value at bus LSDT[m:0], a next occurrence of the low to high transition in the low side signal 345 or 545 occurs earlier with respect to the high to low transition in the data input D.

Similarly, if the data input D is high when the low side signal 345 or 545 transitions from low to high, latch 332 generates an output signal having a high digital logic state. In response to the output signal of the latch 332 having the high digital logic state, digital counter 342 increases the digital counter value at bus LSDT[m:0]. In response to the increased digital counter value at bus LSDT[m:0], a next occurrence of the low to high transition in the low side signal 345 or 545 is delayed with respect to the high to low transition in the data input D.

Figure 4:
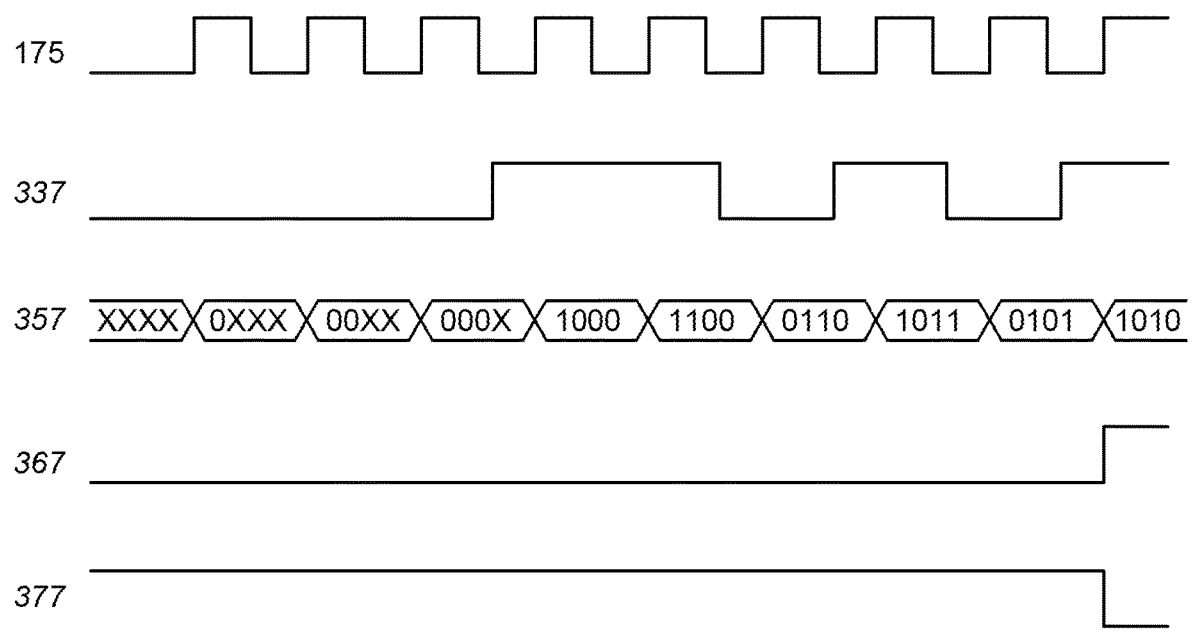
FIG. 4 is a waveform diagram illustrating an embodiment of an operation of the variable delay control circuit of FIG. 3F.

FIG. 4 is a waveform diagram illustrating an embodiment of an operation of the variable delay control circuit of FIG. 3C.

Referring to FIGS. 3F and 4, at each rising edge of the clock signal 175, shift register 352 latches the digital logic state of the output 337 signal of latch 332 and shifts a number N of previously latched digital logic states of the received output signal. In this embodiment N=4. Shift register 352 can generate a digital signal 357 for digital comparator 362 encoding the N (4) most recently latched digital logic states of the received output signal 337.

Digital comparator 362 can receive the digital signal 357 from shift register 352 and compares the received digital signal 357 to one or more specified digital values. In the illustrated example, the one or more specified digital values includes the value 1010, which corresponds with a value for the digital signal indicating that the current counter value at bus LSDT[m:0] is to be maintained by digital counter 342.

Digital comparator 362 can generate an output signal 367 for controller 372 indicating whether the received digital signal 357 from shift register 352 is equal to any of the one or more specified digital values. In the illustrated example, in response to the digital signal 357 becoming equal to 1010, the output signal 367 of the digital comparator 362 indicates that the digital signal 357 from shift register 352 is equal to one of the specified digital values.

In response to controller 372 receiving the digital signal 367 from shift register 352 indicating that the current counter value at bus LSDT[m:0] is to be maintained by digital counter 342, controller 372 causes digital counter 342 to cease counting and maintain the current counter value at bus LSDT[m:0], for example, by changing the state of output 377 to prevent digital counter 342 from receiving the clock signal causing digital counter 342 to increase or decrease the digital counter value, and by preventing shift register 352 from receiving the clock signal causing shift register 352 to latch the digital logic state of the output of latch 332 and change its digital signal output. In the illustrated embodiment, controller 372 additionally disables latch 332 with output 377.

FIG. 5 is a schematic illustration of a switching voltage regulator circuit 500 according to some embodiments. Switching voltage regulator circuit 500 is a switching voltage regulator that is arranged to generate an output voltage at output node 565 based on a reference voltage at reference input node 505, on a power voltage at power input node 185, and on a clock at clock input node 175.

Switching voltage regulator circuit 500 includes controller 510, high side driver circuit 520, high side switch 530, low side driver circuit 540, low side switch 550, inductor 160, and output capacitor 170.

In this embodiment, controller 510 can generate high side pulses in high side control signal 515 for high side driver circuit 520. Each high side pulse is received by high side driver circuit 520, and, in response to the received high side pulse, after a substantially fixed delay, high side driver circuit 520 causes the inductor 160 to be electrically connected with power input node 185 by providing a high side gate signal 525 to high side switch 530.

Controller 510 can also generate low side pulses in low side control signal 555 for low side driver circuit 540. Each low side pulse is received by low side driver circuit 540, and, in response to the received low side pulse, after a low side variable delay controlled by variable delay line 344, low side driver circuit 540 causes the inductor 160 to be electrically connected with the ground node by providing a low side gate signal 545 to low side switch 550.

As understood by those of skill in the art, the synchronous selective electrical connection of inductor 160 with the power input node 185 and the ground node causes charge to be delivered to the output capacitor 170 and to any load (not shown) connected to output node 565.

Furthermore, controller 510 receives the output voltage at output node 565. In addition, using techniques understood by those of skill in the art, controller 510 generates the high side pulses and the low side pulses based partly on a difference between the output voltage at output node 565 and the reference voltage at reference input node 505. As a result, as understood by those of skill in the art, the voltage at the output node 565 is maintained by switching voltage regulator circuit 500 to be about equal to the reference voltage at reference input node 505.

Figure 6:
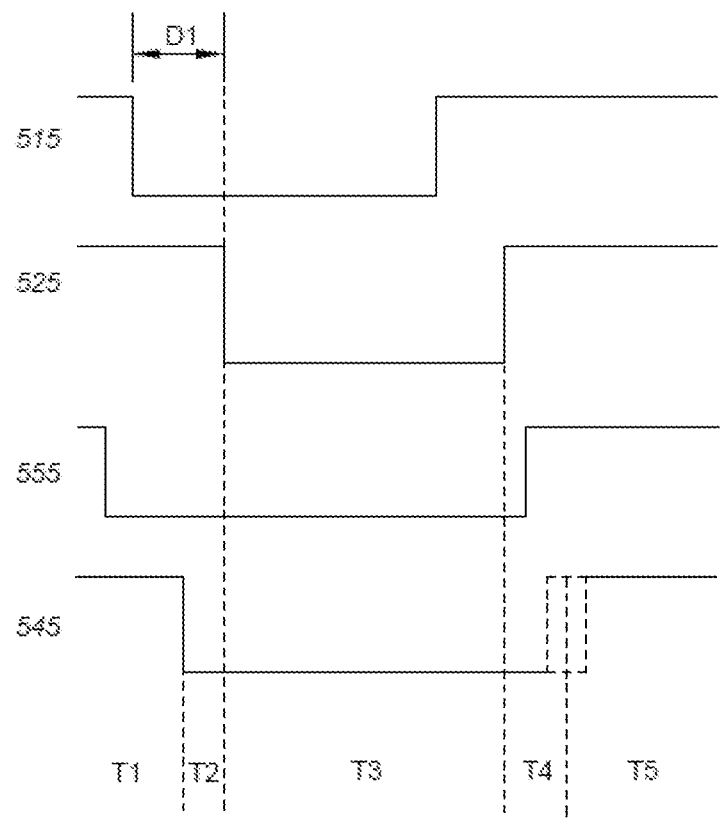
FIG. 6 is a waveform diagram illustrating an embodiment of an operation of the voltage regulator circuit of FIG. 5.

FIG. 6 is a waveform diagram illustrating an embodiment of an operation of the switching voltage regulator circuit 500 of FIG. 5.

Referring to FIGS. 5 and 6, during time T1, the high side signal 525 is caused to be high, and the low side signal 545 is caused to be high. Accordingly, during time T1, high side switch 530 is off or not conductive, and low side switch 550 is on or conductive. As a result, during time T1, switch node 535 is electrically connected with the ground node by low side switch 550.

During time T2, the high side signal 525 remains high, and the low side signal 545 is caused to be low. Accordingly, during time T2, high side switch 530 is not conductive and low side switch 550 is also not conductive. Therefore, time T2 may be considered a first dead time.

The end of time T2 and the beginning of time T3 is characterized by the high to low transition in the high side signal 525. In this embodiment, high side driver circuit 520 causes the high to low transition in the high side signal 525 to occur in response to a high to low transition in the high side control signal 515 from controller 510. In this embodiment, high side driver circuit 520 causes the high to low transition in the high side signal 525 to occur after a first delay time D1 that starts with the high to low transition in the high side control signal 515 and ends with the high to low transition in the high side signal 525.

In this embodiment, the first delay time D1 is not programmable. Accordingly, the duration of first delay time D1 may be dependent on various factors which affect circuit performance, such as power voltages and temperature. Therefore, in some embodiments, the delay between a high to low transition in the high side control signal 515 and the corresponding high to low transition in the high side signal 525 is not dependent other signals or is not dependent on any other signal.

During time T3, the high side signal 525 is caused to be low, and the low side signal 545 remains low. Accordingly, during time T3, high side switch 530 is on or conductive, and low side switch 550 is not conductive. As a result, during time T3, switch node 535 is electrically connected with the power input node 185 by high side switch 530.

During time T4, the high side signal 525 is caused to be high, and the low side signal 545 remains low. Accordingly, during time T4, high side switch 530 is not conductive and low side switch 550 is also not conductive. Therefore, time T4 may be considered a second dead time.

The end of time T4 and the beginning of time T5 is characterized by the low to high transition in the low side signal 545. In this embodiment, low side driver circuit 540 causes the low to high transition in the low side signal 545 to occur in response to a low to high transition in the low side control signal 555 from controller 510. In this embodiment, low side driver circuit 540 causes the low to high transition in the low side signal 545 to occur after a second delay time D2 that starts with the low to high transition in the low side control signal 555, and ends with the low to high transition in the low side signal 545.

In this embodiment, the second delay time D2 is programmable according to a digital signal at input bus LSDT [m:0]. For example, the second delay time D2 may be programmed with the digital signal so as to control when the end of the second dead time of time T4 occurs. An embodiment of a variable delay control circuit which may be used to generate the second digital signal is discussed above with reference to FIG. 3C.

During time T5, the high side signal 525 is caused to be high, and the low side signal 545 is caused to be high. Accordingly, during time T5, high side switch 530 is off or not conductive, and low side switch 550 is on or conductive. As a result, during time T5, switch node 535 is electrically connected with the ground node by low side switch 550.

Therefore, the operation of the switching voltage regulator circuit 500 during time T5 is similar or identical to the operation of the switching voltage regulator circuit 500 during time T1. The operation of the switching voltage regulator circuit 500 may also include repeatedly sequentially cycling through states described with reference times T1-T4 in response to the clock signal at clock input 175.

Figure 7:
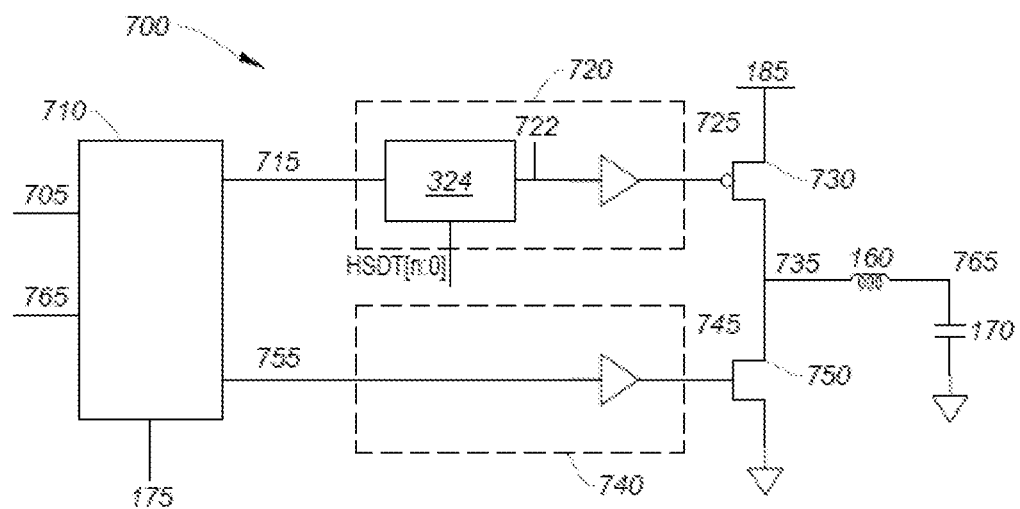
FIG. 7 is a schematic diagram of an embodiment of voltage regulator circuit.

FIG. 7 is a schematic illustration of a switching voltage regulator circuit 700 according to some embodiments. Switching voltage regulator circuit 700 is an example of a switching voltage regulator that is configured to generate an output voltage at output node 765 based on a reference voltage at reference input node 705, on a power voltage at power input node 185, and on a clock at clock input node 175.

Switching voltage regulator circuit 700 can include controller 710, high side driver circuit 720, high side switch 730, low side driver circuit 740, low side switch 750, inductor 160, and output capacitor 170.

In this embodiment, controller 710 can generate high side pulses in high side control signal 715 for high side driver circuit 720. Each high side pulse is received by high side driver circuit 720, and, in response to the received high side pulse, after a high side variable delay controlled by variable delay line 324, high side driver circuit 720 causes the inductor 160 to be electrically connected with power input node 185 by providing a high side gate signal 725 to high side switch 730.

Controller 710 can also generate low side pulses in low side control signal 755 for low side driver circuit 740. Each low side pulse is received by low side driver circuit 740, and, in response to the received low side pulse, after a substantially fixed delay, low side driver circuit 740 causes the inductor 160 to be electrically connected with the ground node by providing a low side gate signal 745 to low side switch 750.

The synchronous selective electrical connection of inductor 160 with the power input node 185 and the ground node causes charge to be delivered to the output capacitor 170 and to any load (not shown) connected to output node 765.

Furthermore, controller 710 can receive the output voltage at output node 765. In addition, using techniques understood by those of skill in the art, controller 710 generates the high side pulses and the low side pulses based partly on a difference between the output voltage at output node 765 and the reference voltage at reference input node 705. As a result, as understood by those of skill in the art, the voltage at the output node 765 is maintained by switching voltage regulator circuit 700 to be about equal to the reference voltage at reference input node 705.

Figure 8:
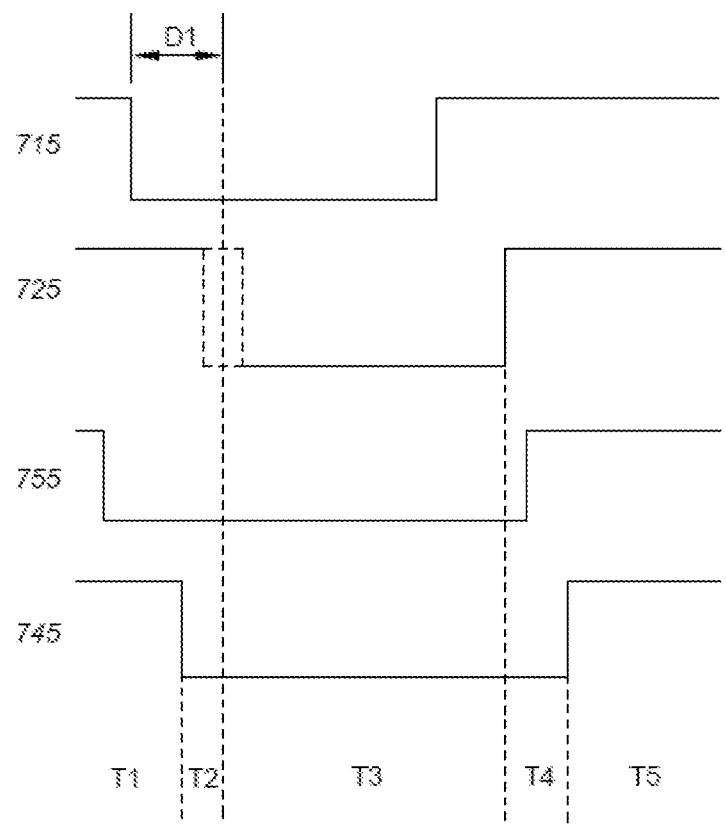
FIG. 8 is a waveform diagram illustrating an embodiment of an operation of the voltage regulator circuit of FIG. 7.

FIG. 8 is a waveform diagram illustrating an embodiment of an operation of the switching voltage regulator circuit 700 of FIG. 7.

Referring to FIGS. 7 and 8, during time T1, the high side signal 725 is caused to be high, and the low side signal 745 is caused to be high. Accordingly, during time T1, high side switch 730 is off or not conductive, and low side switch 750 is on or conductive. As a result, during time T1, switch node 735 is electrically connected with the ground node by low side switch 750.

During time T2, the high side signal 725 remains high, and the low side signal 745 is caused to be low. Accordingly, during time T2, high side switch 730 is not conductive and low side switch 750 is also not conductive. Therefore, time T2 may be considered a first dead time.

The end of time T2 and the beginning of time T3 is characterized by the high to low transition in the high side signal 725. In this embodiment, high side driver circuit 720 causes the high to low transition in the high side signal 725 to occur in response to a high to low transition in the high side control signal 715 from controller 710. In this embodiment, high side driver circuit 720 causes the high to low transition in the high side signal 725 to occur after a first delay time D1 that starts with the high to low transition in the high side control signal 715 and ends with the high to low transition in the high side signal 725.

In this embodiment, the first delay time D1 is programmable according to a digital signal at input bus HSDT[n:0]. For example, the first delay time D1 may be programmed with the digital signal so as to control when the end of the first dead time of time T2 occurs. The variable delay control circuit of FIG. 3C may be used to generate the first digital signal.

During time T3, the high side signal 725 is caused to be low, and the low side signal 745 remains low. Accordingly, during time T3, high side switch 730 is on or conductive, and low side switch 750 is not conductive. As a result, during time T3, switch node 735 is electrically connected with the power input node 185 by high side switch 730.

During time T4, the high side signal 725 is caused to be high, and the low side signal 745 remains low. Accordingly, during time T4, high side switch 730 is not conductive and low side switch 750 is also not conductive. Therefore, time T4 may be considered a second dead time.

The end of time T4 and the beginning of time T5 is characterized by the low to high transition in the low side signal 745. In this embodiment, low side driver circuit 740 causes the low to high transition in the low side signal 745 to occur in response to a low to high transition in the low side control signal 755 from controller 710. In this embodiment, low side driver circuit 740 causes the low to high transition in the low side signal 745 to occur after a second delay time D2 that starts with the low to high transition in the low side control signal 755, and ends with the low to high transition in the low side signal 745.

In this embodiment, the second delay time D2 is not programmable. Accordingly, the duration of second delay time D2 may be dependent on various factors which affect circuit performance, such as power voltages and temperature. Therefore, in some embodiments, the delay between a low to high transition in the low side control signal 755 and the corresponding low to high transition in the high side signal 745 is not dependent other signals or is not dependent on any other signal.

During time T5, the high side signal 725 is caused to be high, and the low side signal 745 is caused to be high. Accordingly, during time T5, high side switch 730 is off or not conductive, and low side switch 750 is on or conductive. As a result, during time T5, switch node 735 is electrically connected with the ground node by low side switch 750.

Therefore, the operation of the switching voltage regulator circuit 700 during time T5 is similar or identical to the operation of the switching voltage regulator circuit 700 during time T1. The operation of the switching voltage regulator circuit 700 may also include repeatedly sequentially cycling through states described with reference times T1-T4 in response to the clock signal at clock input 175.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A circuit, comprising:
   a switching circuit including a high side switch connected to a low side switch at a switch node;
   a first controller arranged to generate a high side control signal and a low side control signal;
   a variable delay circuit arranged to:
      receive the high side control signal and in response, transmit a corresponding delayed high side control signal; and
      receive the low side control signal and in response, transmit a corresponding delayed low side control signal;
   a high side driver circuit arranged to transmit a high side drive signal to the high side switch in response to receiving the delayed high side control signal; and
   a low side driver circuit arranged to transmit a low side drive signal to the low side switch in response to receiving the delayed low side control signal; and
   wherein the first controller is further arranged to generate a particular high side control signal;
   wherein the variable delay circuit is arranged to change a high side delay time, and wherein the variable delay circuit comprises:
      a shift register arranged to store data;
      a comparator arranged to compare the stored data of the shift register to indicate whether received digital signal from the shift register is equal to any of one or more specified digital values;
      wherein the comparator is arranged to generate an output signal for a second controller indicating whether the stored data from shift register is equal to any of one or more specified digital values;
      wherein the second controller is coupled to a first counter arranged to receive a clock signal; and
      wherein the second controller is arranged to prevent the first counter from receiving the clock signal in response to receiving a digital signal indicating that a current counter value is to be maintained by the first counter.

2. The circuit of claim 1, the first counter is coupled to the shift register, wherein the high side delay time is increased in response to an increase in a digital count value in an output of the first counter.

3. The circuit of claim 2, wherein the high side delay time is decreased in response to a decrease in a digital count value in an output of the first counter.

4. The circuit of claim 1, wherein the high side delay time is programmable.

5. The circuit of claim 1, wherein the variable delay circuit is arranged to change a low side delay time.

6. The circuit of claim 5, wherein the variable delay circuit comprises a second counter coupled to a second shift register, wherein the low side delay time is increased in response to an increase in a digital count value in an output of a second counter.

7. The circuit of claim 6, wherein the low side delay time is decreased in response to a decrease in a digital count value in an output of the second counter.

8. The circuit of claim 5, wherein the variable delay circuit is arranged to cease changing the low side delay time in response to the second controller receiving the digital signal indicating that the current counter value is to be maintained.

9. A method comprising:
   providing a switching circuit including a high side switch connected to a low side switch at a switch node;
   generating a plurality of high side control signals and a plurality of low side control signals;
   generating a corresponding delayed high side control signal, by a variable delay circuit, in response to receiving each of the plurality of high side control signals;
   generating a corresponding delayed low side control signal, by the variable delay circuit, in response to receiving each of the plurality of low side control signals;

electrically connecting the switch node to a power supply via the high side switch in response to receiving the delayed high side control signal;

electrically connecting the switch node to a ground node via the low side switch in response to receiving the delayed low side control signal; and wherein the variable delay circuit comprises:
- a shift register arranged to store data;
- a comparator arranged to compare the stored data of the shift register to indicate whether received digital signal from the shift register is equal to any of one or more specified digital values; and wherein the comparator is arranged to generate an output signal for a second controller indicating whether the stored data from shift register is equal to any of the one or more specified digital values;

wherein the second controller is coupled to a first counter arranged to receive a clock signal; and wherein the second controller is arranged to prevent the first counter from receiving the clock signal in response to receiving a digital signal indicating that a current counter value is to be maintained by the first counter.

10. The method of claim 9, wherein the switching circuit further comprises a high side driver circuit and a low side driver circuit.

11. The method of claim 10, wherein after electrically connecting the switch node to the power supply, the delayed high side control signal causes the high side switch to disconnect the switch node from the power supply.

12. The method of claim 11, further comprising generating a particular high side control signal, and further comprising changing a high side delay time.

13. The method of claim 12, further comprising increasing the high side delay time in response to an increase in a digital count value in an output of the first counter of the variable delay circuit.

14. The method of claim 12, further comprising decreasing the high side delay time in response to a decrease in a digital count value in an output of a second counter of the variable delay circuit.

15. The method of claim 12, further comprising ceasing to change the high side delay time in response to the second controller receiving the digital signal indicating that the current counter value is to be maintained.

16. The method of claim 10, wherein after electrically connecting the switch node to the ground node, the delayed low side control signal causes the low side switch to disconnect the switch node from the ground node.

* * * * *